United States Patent
Metivier-Larochelle et al.

(10) Patent No.: US 11,498,836 B1
(45) Date of Patent: Nov. 15, 2022

(54) METHOD FOR THE PRODUCTION OF IRON OXIDE PIGMENT OR PIGMENT INTERMEDIATE AND HYDROCHLORIC ACID

(71) Applicant: L3 Développement de procédés Inc., Trois-Rivières (CA)

(72) Inventors: Tommee Metivier-Larochelle, Sandy, UT (US); Eric F. Larochelle, West Jordan, UT (US)

(73) Assignee: L3 Développement de procédés Inc., Trois-Rivières (CA)

( * ) Notice: Subject to any disclaimer, the term of this patent is extended or adjusted under 35 U.S.C. 154(b) by 355 days.

(21) Appl. No.: 16/899,244

(22) Filed: Jun. 11, 2020

Related U.S. Application Data

(60) Provisional application No. 62/861,365, filed on Jun. 14, 2019.

(51) Int. Cl.
  *C01G 49/02* (2006.01)
  *C01G 49/06* (2006.01)
  *C01B 7/05* (2006.01)

(52) U.S. Cl.
  CPC .............. *C01B 7/055* (2013.01); *C01G 49/02* (2013.01)

(58) Field of Classification Search
  None
  See application file for complete search history.

(56) References Cited

U.S. PATENT DOCUMENTS

| | | | |
|---|---|---|---|
| 2,105,670 A | * | 1/1938 | Perkins .................. C01G 49/06 106/459 |
| 2,823,981 A | | 2/1958 | Fuchsman |
| 3,792,153 A | | 2/1974 | Lynn et al. |

(Continued)

OTHER PUBLICATIONS

Lanxess Deutschland GMBH, "Inorganic pigments using the Laux process", Nov. 2011 (12 pages).

*Primary Examiner* — Tam M Nguyen
(74) *Attorney, Agent, or Firm* — Tillman Wright, PLLC; Chad D. Tillman; David R. Higgins

(57) ABSTRACT

A method for producing an iron pigment and hydrochloric acid with reduced or substantially eliminated waste streams includes: providing an iron chloride solution, wherein the iron chloride solution includes one or both of iron (II) chloride and iron (III) chloride; neutralizing the iron chloride solution with one or both of ammonia and ammonium hydroxide to form a slurry of an iron oxide solid component and an ammonium chloride solution; separating the iron oxide solid component from the ammonium chloride solution; drying the iron oxide solid component to form an iron pigment or pigment intermediate; reacting the ammonium chloride solution with an alkaline-earth metal solid to form an alkaline-earth metal chloride solution and to evolve ammonia as a vapor, wherein at least a portion of the evolved ammonia reacts with water to form ammonium hydroxide; recycling one or both of the evolved ammonia and the formed ammonium chloride for use in connection with the neutralization step; and pyrohydrolyzing the alkaline-earth metal chloride solution to form hydrochloric acid and to regenerate the alkaline-earth metal solid. Iron pigment or pigment intermediate produced in accordance with the method may have a yellow, red, or black color.

20 Claims, 2 Drawing Sheets

(56) References Cited

U.S. PATENT DOCUMENTS

| | | | |
|---|---|---|---|
| 4,935,219 A * | 6/1990 | Escolar | C01C 1/16 423/470 |
| 6,179,908 B1 | 1/2001 | Braun et al. | |
| 10,487,374 B2 | 11/2019 | Dahal | |
| 2021/0269327 A1 * | 9/2021 | Hashimoto | C04B 35/62222 |

* cited by examiner

METHOD FOR THE PRODUCTION OF IRON OXIDE PIGMENT OR PIGMENT INTERMEDIATE AND HYDROCHLORIC ACID

CROSS-REFERENCE TO RELATED APPLICATIONS

The present application is a U.S. nonprovisional patent application of, and claims priority under 35 U.S.C. § 119(e) to, U.S. provisional patent application 62/861,365, filed Jun. 14, 2019, which provisional patent application is incorporated by reference herein in its entirety.

COPYRIGHT STATEMENT

Any new and original work of authorship in this document—including any source code—is subject to copyright protection under the copyright laws of the United States and other countries. Reproduction by anyone of this document as it appears in official governmental records is permitted, but otherwise all other copyright rights whatsoever are reserved.

BACKGROUND OF THE INVENTION

The invention generally relates to a method for the production of yellow, red, or black iron oxide pigment or pigment intermediate in addition to hydrochloric acid.

Iron oxides have been used as coloring agents and pigments for many years. While iron oxides form naturally, chemical processes have been developed to scale up iron oxide formation for industry use.

One current iron oxide pigment manufacturing process is the Laux process. In the Laux process, nitrobenzene is reacted with metallic iron to produce a suspension of black or yellow iron oxide and aniline. The suspension is subsequently washed, concentrated, and dried. Red pigments, which cannot be obtained directly by the Laux process are produced by subsequent calcining of the Laux process iron oxide product under oxidative conditions.

In a related iron oxide pigment manufacturing process, described in U.S. Pat. No. 6,179,908 to Braun et al., an iron salt (such as iron chloride or iron sulfate) is neutralized with a base. Following optional oxidation, the solid component is precipitated, dried, and calcined to produce the desired iron pigment. Braun et al. also describe a process for the production of iron oxide red pigments by calcination of iron oxide yellow or black pigments.

Still other manufacturing processes utilize sulfuric acid-based distillation or direct pyrohydrolysis of metal chlorides. However, it has been demonstrated that direct pyrohydrolysis of iron (II and/or III) chloride is not likely to result in consistent pigment-grade iron oxides.

In accordance with known processes, management of waste streams from chemical processes presents challenges to overcome. In many instances, waste streams must be disposed of in a safe and environmentally-friendly manner. In this regard, processes that reduce or substantially eliminate potential waste streams would offer substantial value to processors.

In other instances, waste streams can be re-utilized as reagents for other industrial processes or operations. One reagent commonly producible as a byproduct in chemical processes is hydrochloric acid. And, although hydrochloric acid is highly corrosive and must be treated with care, it also has significance as a reagent across a wide range of other chemical processes—particularly those that involve acid treatments for cleaning purposes.

Current processes for the recovery and concentration of hydrochloric acid include the pressure-swing distillation process where low grade acid is distilled in a two-column circuit operating at a different pressure to break the hydrochloric acid-water azeotrope. Simple and efficient methods of producing reagent-grade hydrochloric acid would offer improvements over existing processes.

A need exists for improvement in the field of yellow, red, or black iron oxide pigment or pigment intermediate production where byproducts of the process are recyclable or usable for an alternate purpose. Furthermore, a need exists for a simple and efficient way to produce a concentrated hydrochloric acid. These, and other needs, are addressed by one or more aspects of the invention.

SUMMARY OF THE INVENTION

The invention includes many aspects and features. Moreover, while many aspects and features relate to, and are described in, the context of a method for the production of yellow, red, or black iron oxide pigment or pigment intermediate in addition to hydrochloric acid, the invention is not limited to use only in connection with a method for the production of yellow, red, or black iron oxide pigment or pigment intermediate in addition to hydrochloric acid, as will become apparent from the following summaries and detailed descriptions of aspects, features, and one or more embodiments of the invention.

Broadly defined, the present invention according to one aspect includes a method for producing an iron pigment and hydrochloric acid with reduced or substantially eliminated waste streams. The method includes: providing an iron chloride solution, wherein the iron chloride solution includes one or both of iron (II) chloride and iron (III) chloride; neutralizing the iron chloride solution with one or both of ammonia and ammonium hydroxide to form a slurry of an iron oxide solid component and an ammonium chloride solution; separating the iron oxide solid component from the ammonium chloride solution; drying and calcining the iron oxide solid component to form an iron pigment or pigment intermediate; reacting the ammonium chloride solution with an alkaline-earth metal solid to form an alkaline-earth metal chloride solution and to evolve ammonia as a vapor, wherein at least a portion of the evolved ammonia reacts with water to form ammonium hydroxide; recycling one or both of the evolved ammonia and the formed ammonium hydroxide for use in connection with the neutralization step; and pyrohydrolyzing the alkaline-earth metal chloride solution to form hydrochloric acid and to regenerate the alkaline-earth metal solid.

In a feature of this aspect, the iron pigment or pigment intermediate is a yellow color. In another feature of this aspect, the iron pigment or pigment intermediate is a red color. In another feature of this aspect, the iron pigment or pigment intermediate is a black color.

In a feature of this aspect, the iron pigment or pigment intermediate includes an iron oxide pigment. In another feature of this aspect, the iron pigment or pigment intermediate includes an iron hydroxide pigment. In another feature of this aspect, the iron pigment or pigment intermediate includes an iron oxide-hydroxide pigment.

In a feature of this aspect, the iron oxide solid component formed in the neutralization step includes an iron oxide-hydroxide in the form of α-goethite or β-goethite.

In a feature of this aspect, the alkaline-earth metal solid includes one or more of magnesium oxide, magnesium hydroxide, magnesium oxychloride, calcium oxide, or calcium hydroxide.

In a feature of this aspect, the method further includes recycling at least a portion of the regenerated alkaline-earth metal solid for use in the reaction with the ammonium chloride solution.

In a feature of this aspect, a concentration of the formed hydrochloric acid is between about 22 wt % and about 36 wt %. In another feature of this aspect, a concentration of the formed hydrochloric acid is between about 26 wt % and about 28 wt %.

Broadly defined, the present invention according to another aspect includes a method for producing hydrochloric acid and a metal precipitate with reduced or substantially eliminated waste streams. The method includes: providing a metal chloride solution; neutralizing the metal chloride solution with one or both of ammonia and ammonium hydroxide to form a slurry of a metal compound solid component and an ammonium chloride solution; separating the metal compound solid component from the ammonium chloride solution, wherein the metal compound solid component is a metal precipitate; reacting the ammonium chloride solution with an alkaline-earth metal solid to form an alkaline-earth metal chloride solution and to evolve ammonia as a vapor, wherein at least a portion of the evolved ammonia reacts with water to form ammonium hydroxide; recycling one or both of the evolved ammonia and the formed ammonium hydroxide for use in connection with the neutralization step; and pyrohydrolyzing the alkaline-earth metal chloride solution to form hydrochloric acid and to regenerate the alkaline-earth metal solid.

In a feature of this aspect, the alkaline-earth metal solid includes one or more of magnesium oxide, magnesium hydroxide, magnesium oxychloride, calcium oxide, or calcium hydroxide.

In a feature of this aspect, the method further includes recycling at least a portion of the regenerated alkaline-earth metal solid for use in the reaction with the ammonium chloride solution.

In a feature of this aspect, a concentration of the formed hydrochloric acid is between about 22 wt % and about 36 wt %.

In a feature of this aspect, the metal compound solid component formed in the neutralization step includes a metal hydroxide, a mixture of metal hydroxides, a metal oxide, or a mixture of metal oxides.

In a feature of this aspect, the metal compound solid component formed in the neutralization step includes one or more lanthanoid metals, actinoid metals, transition metals, post transition metals, or combinations of any of the foregoing.

In a feature of this aspect, the neutralization step forms multiple different metal compound solid components, and wherein the method further comprises precipitating the different metal compound solid components sequentially to facilitate separation of different metal precipitates from one another.

Broadly defined, the present invention according to another aspect includes a method for producing an iron pigment and hydrochloric acid with reduced or substantially eliminated waste streams. The method includes: providing an iron chloride solution, wherein the iron chloride solution includes one or both of iron (II) chloride and iron (III) chloride; neutralizing the iron chloride solution with one or both of ammonia and ammonium hydroxide to form a slurry of an iron oxide solid component and an ammonium chloride solution; separating the iron oxide solid component from the ammonium chloride solution; drying and calcining the iron oxide solid component to form an iron pigment or pigment intermediate; reacting the ammonium chloride solution with an alkaline-earth metal solid to form an alkaline-earth metal chloride solution and to evolve ammonia as a vapor, wherein at least a portion of the evolved ammonia reacts with water to form ammonium hydroxide, and wherein the alkaline-earth metal solid includes one or more of magnesium oxide, magnesium hydroxide, magnesium oxychloride, calcium oxide, or calcium hydroxide; recycling one or both of the evolved ammonia and the formed ammonium hydroxide for use in connection with the neutralization step; pyrohydrolyzing the alkaline-earth metal chloride solution to form hydrochloric acid and to regenerate the alkaline-earth metal solid, wherein a concentration of the formed hydrochloric acid is between about 22 wt % and about 36 wt %; and recycling at least a portion of the regenerated alkaline-earth metal solid for use in the reaction with the ammonium chloride solution.

In addition to the aforementioned aspects and features of the invention, it should be noted that the invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the invention now will be described in detail with reference to the accompanying drawings, wherein the same elements are referred to with the same reference numerals, and wherein.

DETAILED DESCRIPTION

Figure 1:
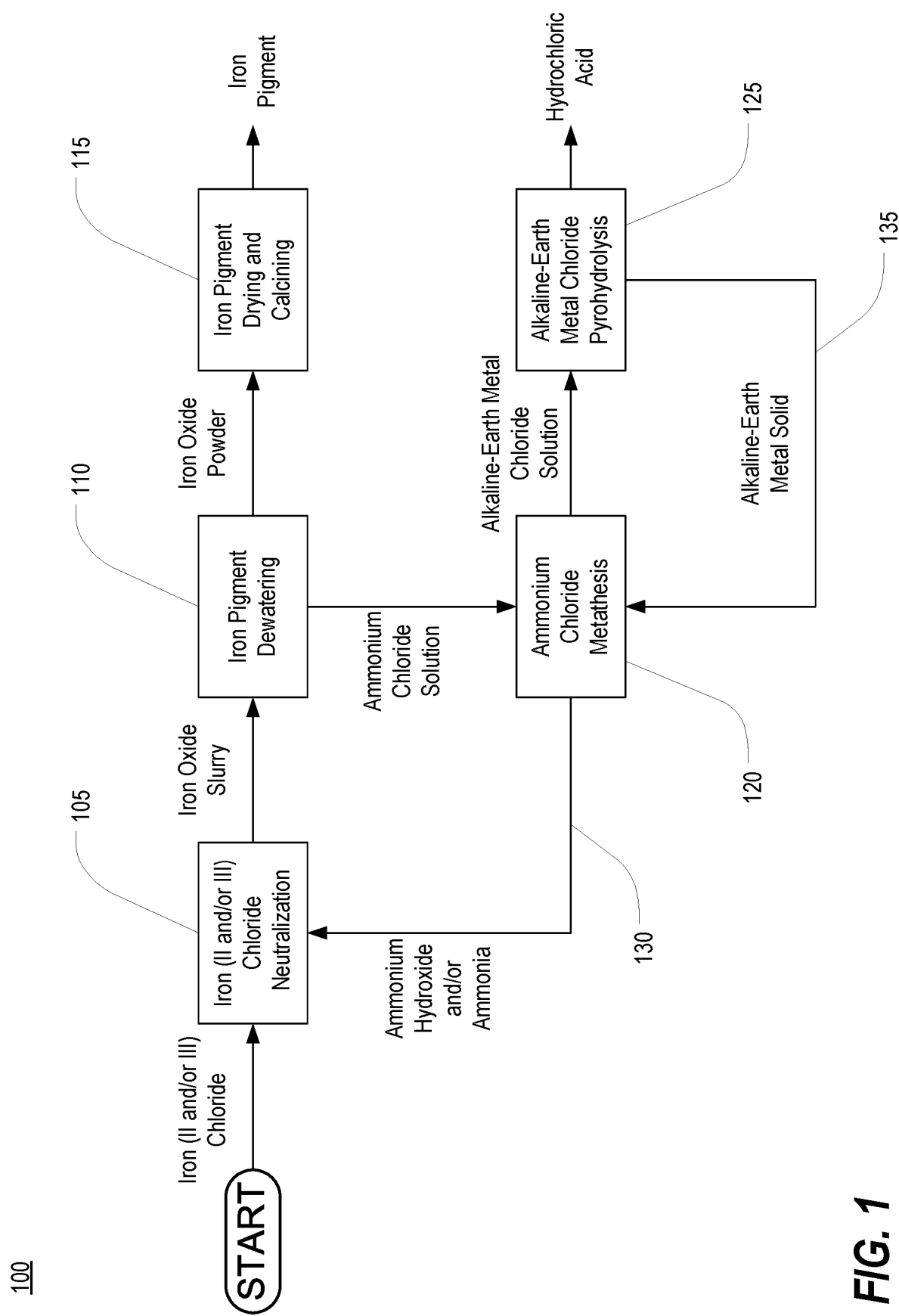
FIG. 1 is a flowchart of a method of producing iron oxide pigment or pigment intermediate, in addition to hydrochloric acid, where reagents of the process are internally recycled, in accordance with one or more aspects of the invention.

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention and is made merely for the purposes of providing a full and enabling disclosure of the invention.

The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once but not necessarily every time during performance of the claimed method.

Furthermore, it is important to note that, as used herein, "comprising" is open-ended insofar as that which follows such term is not exclusive. Additionally, "a" and "an" each generally denotes "at least one" but does not exclude a plurality unless the contextual use dictates otherwise. Thus, reference to "a picnic basket having an apple" is the same as "a picnic basket comprising an apple" and "a picnic basket including an apple", each of which identically describes "a picnic basket having at least one apple" as well as "a picnic basket having apples"; the picnic basket further may contain one or more other items beside an apple. In contrast, reference to "a picnic basket having a single apple" describes "a picnic basket having only one apple"; the picnic basket further may contain one or more other items beside an apple. In contrast, "a picnic basket consisting of an apple" has only a single item contained therein, i.e., one apple; the picnic basket contains no other item.

When used herein to join a list of items, "or" denotes "at least one of the items" but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers"; the picnic basket further may contain one or more other items beside cheese and crackers.

When used herein to join a list of items, "and" denotes "all of the items of the list". Thus, reference to "a picnic basket having cheese and crackers" describes "a picnic basket having cheese, wherein the picnic basket further has crackers", as well as describes "a picnic basket having crackers, wherein the picnic basket further has cheese"; the picnic basket further may contain one or more other items beside cheese and crackers.

The phrase "at least one" followed by a list of items joined by "and" denotes an item of the list but does not require every item of the list. Thus, "at least one of an apple and an orange" encompasses the following mutually exclusive scenarios: there is an apple but no orange; there is an orange but no apple; and there is both an apple and an orange. In these scenarios if there is an apple, there may be more than one apple, and if there is an orange, there may be more than one orange. Moreover, the phrase "one or more" followed by a list of items joined by "and" is the equivalent of "at least one" followed by the list of items joined by "and".

Referring now to the drawings, one or more preferred embodiments of the invention are next described. The following description of one or more preferred embodiments is merely exemplary in nature and is in no way intended to limit the invention, its implementations, or uses.

FIG. 1 is a flowchart of a method 100 of producing iron oxide pigment or pigment intermediate, in addition to hydrochloric acid, where reagents of the process are internally recycled, in accordance with one or more aspects of the invention. As shown in FIG. 1, iron oxide pigment or pigment intermediates, in addition to hydrochloric acid, are producible using iron (II) chloride solution and/or iron (III) chloride solution. When used herein in a general manner, the term "iron oxide" includes chemical compounds with both iron and oxygen, chemical compounds with iron, oxygen, and hydrogen, or combinations of the foregoing. Accordingly, when used generally, the term "iron oxide" includes iron oxides as well as iron hydroxides and iron oxide-hydroxides.

Two internal recycle streams, described in more detail hereinbelow, can substantially eliminate the consumption of reagents of the process. In this manner, the method 100 of FIG. 1 can provide significant commercial value to firms who seek to maximize the value of their iron chloride waste streams.

In accordance with a contemplated embodiment, yellow iron oxide pigment or pigment intermediate is produced from iron chloride with concentrated hydrochloric acid as a byproduct. In accordance with another contemplated embodiment, black iron oxide pigment or pigment intermediate is produced from iron chloride with concentrated hydrochloric acid as a byproduct. In accordance with still another contemplated embodiment, red iron oxide pigment or pigment intermediate is produced from iron chloride with concentrated hydrochloric acid as a byproduct.

As shown in the flowchart of FIG. 1, the method 100 is initiated with the provision of an iron chloride solution. In contemplated embodiments, the iron chloride solution includes iron (II) chloride, iron (III) chloride, or both iron (II) and iron (III) chloride. When used herein, the term "iron chloride" refers to and includes iron (II) chloride, iron (III) chloride, or a combination of both iron (II) chloride and iron (III) chloride. Iron chloride solutions are commonly producible as a waste stream from other industrial or chemical processes. In this regard, it is contemplated that the iron chloride solution used in connection with the process of FIG. 1 may be a waste stream byproduct of another industrial or chemical process.

In an iron chloride neutralization step 105 of the method 100 of FIG. 1, the iron chloride solution is placed in a reactor with ammonia or ammonium hydroxide to produce an iron oxide slurry and ammonium chloride.

In at least some contemplated embodiments, an ammonium hydroxide concentration can be varied from 10% to saturation, or alternatively, anhydrous ammonia can be injected in the system in connection with the iron chloride neutralization step 105. It is further contemplated that the iron chloride neutralization reaction is performed at an operating temperature between about 25° C. and the solution boiling point, or, more preferably, between about 85° C. and about 100° C. Many different reactor configurations could be used to achieve the iron chloride neutralization reaction of step 105. It is also contemplated that the operating temperature could be increased or decreased based on the operating pressure of the system.

In at least some contemplated embodiments, an iron oxide produced in connection with the iron chloride neutralization step 105 is present as an iron oxide-hydroxide in the form of α-goethite or β-goethite.

In at least some contemplated embodiments of the iron chloride neutralization step 105, iron(II) chloride reacts with ammonium hydroxide to produce iron(II) hydroxide and ammonium chloride, in accordance with the following reaction:

$$FeCl_2 + 2NH_4OH \rightarrow Fe(OH)_2 + 2NH_4Cl$$

In at least some contemplated embodiments of the iron chloride neutralization step 105, iron(III) chloride reacts with ammonia and water to produce iron(III) hydroxide and ammonium chloride, in accordance with the following reaction:

$$FeCl_3 + 3NH_4OH \rightarrow Fe(OH)_3 + 3NH_4Cl$$

In an iron pigment dewatering step 110 of the method 100 of FIG. 1, the iron oxide slurry from the iron chloride neutralization step 105 is dewatered to produce an iron oxide powder and an ammonium chloride solution. In the dewatering step 110, a solid iron pigment component is separated from the ammonium chloride solution. In various contemplated embodiments, separation of the solid and aqueous components can be accomplished by one or more of pumping, filtration, or centrifugation. In contemplated embodiments, the iron oxide slurry is dewatered in the iron pigment dewatering step 110 to produce an iron oxide powder having a solids content between about 40 wt % and about 85 wt % solids, or, more preferably, between about 70 wt % and 80 wt % solids.

The iron oxide powder produced from the dewatering step 110 is passed to an iron pigment drying and calcining step 115. The ammonium chloride solution from the dewatering step 110 is passed to a reactor for further processing, as discussed in greater detail below.

In the iron pigment drying and calcining step 115, the iron oxide powder is treated to produce iron pigments or iron pigment intermediates usable for further industrial or chemical processes. In at least some embodiments, the drying and calcining step 115 takes place in a calciner or a rotating drum within a furnace to produce a high temperature for treating the iron oxide powder. It is contemplated that products resulting from the drying and calcining step 115 may be in the form of iron pigments or iron pigment intermediates of a yellow, red, or black hue. It is further contemplated that iron pigments or iron pigment intermediates resulting from the drying and calcining step 115 may exist in any of a variety of forms, including, but not limited to, iron oxides, iron hydroxides, and iron oxide-hydroxides.

In an ammonium chloride metathesis step 120, the ammonium chloride solution from the dewatering step 110 is placed in a reactor with an alkaline-earth metal solid to produce ammonia or ammonium hydroxide and an alkaline earth-metal chloride solution. It is contemplated that the reaction of the ammonium chloride metathesis step 120 is performed near or at its boiling point. In accordance with a preferred embodiment, the operating temperature of the ammonium chloride metathesis reaction is between about 95° C. and about 100° C. It is further contemplated that the operating temperature may be less than 95° C. in an environment where a vacuum is applied. Many different reactor configurations could be used to achieve the ammonium chloride metathesis reaction of step 120. It is also contemplated that the operating temperature could be increased or decreased based on the operating pressure of the system.

In various contemplated embodiments the alkaline-earth metal solid used in the ammonium chloride metathesis step 110 includes one or more of magnesium oxide, magnesium hydroxide, or magnesium oxychloride, with the foregoing existing as compounds, as part of a mixture, or in solution. In other contemplated embodiments, the alkaline-earth metal solid is a calcium solid, such as calcium oxide or calcium hydroxide, with the calcium solid existing as a compound, as part of a mixture, or in solution.

In at least some contemplated embodiments of the ammonium chloride metathesis step 120, ammonium chloride reacts with solid magnesium oxide to produce magnesium chloride, ammonia gas, and water vapor, in accordance with the following reaction:

$$2NH_4Cl + MgO \rightarrow MgCl_2 + 2NH_3 + H_2O$$

Ammonia gas and water vapor can be condensed to produce ammonium hydroxide in accordance with the following reaction:

$$NH_3 + H_2O \rightarrow NH_4OH$$

The alkaline-earth metal chloride solution produced from the metathesis step 120 is passed along to an alkaline-earth metal chloride pyrohydrolysis step 125. Ammonia and/or ammonium hydroxide produced from the metathesis step 120 is returned, via a first recycle stream 130, to the iron chloride neutralization step 105 for further reaction with iron chlorides introduced to the reactor.

In the alkaline-earth metal chloride pyrohydrolysis step 125, the alkaline-earth metal chloride solution is pyrohydrolyzed to produce an alkaline-earth metal solid and concentrated hydrochloric acid. As a separation technique, pyrohydrolysis occurs under high temperature conditions and in the presence of water to hydrolyze chlorides and other compounds. Advantageously, pyrohydrolysis facilitates a clean separation whereby resulting compounds are substantially free from contaminants. In this regard, use of pyrohydrolysis in accordance with the present invention enables production of an alkaline-earth metal solid and hydrochloric acid that are substantially free from contaminants in accordance with the alkaline-earth metal chloride pyrohydrolysis step 125.

In at least some contemplated embodiments, the hydrochloric acid concentration produced is between about 22 wt % and about 36 wt %, or, more preferably, between about 26 wt % and about 28 wt %. It is contemplated that a variety of different alkaline solids are producible in connection with the alkaline-earth metal chloride pyrohydrolysis step 125. In various contemplated embodiments, the alkaline-earth metal solid produced from the pyrohydrolysis step 125 includes one or more of magnesium oxide, magnesium hydroxide, or magnesium oxychloride. In other contemplated embodiments, the alkaline-earth metal solid produced from the pyrohydrolysis step 225 is a calcium solid, such as calcium oxide or calcium hydroxide.

In at least some contemplated embodiments of the alkaline-earth metal chloride pyrohydrolysis step 125, magnesium chloride reacts with water under high temperature conditions to produce magnesium oxide and hydrochloric acid, in accordance with the following reaction:

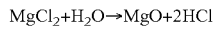

$$MgCl_2 + H_2O \rightarrow MgO + 2HCl$$

Hydrochloric acid produced from the alkaline-earth metal chloride pyrohydrolysis step 125 is usable as a reagent for further industrial or chemical processes. The alkaline-earth metal solid produced from the alkaline-earth metal chloride pyrohydrolysis step 125 is returned, via a second recycle stream 135, to the ammonium chloride metathesis step 120 for further reaction with the ammonium chloride solution introduced to the reactor following the dewatering step 110.

In accordance with the method 100 of FIG. 1, iron pigment and a concentrated hydrochloric acid are produced, each of which may be used in connection with further industrial or chemical processes. Advantageously, the method of FIG. 1 utilizes two recycle streams 130,135, whereby waste materials from one step of the process are recyclable for use as a reagent in another step of the process. In particular, in the first recycle stream 130, ammonium hydroxide or ammonia produced during the ammonium chloride metathesis step 120 is recyclable for use as a reagent in the iron chloride neutralization step 105. Additionally, in the second recycle stream 135, an alkaline-earth metal solid produced during the alkaline-earth metal chloride pyrohydrolysis step 125 is recyclable for use as a reagent in the ammonium chloride metathesis step 120. In this regard, the method 100 can be used to produce iron pigment of a yellow, red, or black hue, in addition to hydrochloric acid, without generating waste streams.

EXAMPLE: In accordance with a preferred embodiment of the present invention, and with further reference to FIG. 1, 100 grams of a 43% solution of iron chloride in water is neutralized in the iron chloride neutralization step 105 using 45 grams of a 62% ammonium hydroxide solution in water. The iron chloride neutralization step 105 produced 23.6 grams of iron oxide solids precipitated as goethite in a solution of 35 wt % ammonium chloride.

The goethite solids are washed with 22 grams of deionized water in a counter current fashion in the iron pigment dewatering step 110. The goethite solids are dried and calcined to produce an iron oxide pigment in the iron pigment drying and calcining step 115.

The ammonium chloride solution is reacted with 16 grams of highly reactive magnesium oxide powder in the ammonium chloride metathesis step 120 to produce a magnesium chloride solution and to evolve ammonia and water vapor. The ammonia and water vapor can be condensed to ammonium hydroxide and recycled to the iron chloride neutralization step 105 via the first recycle stream 130. The operating temperature for the ammonium chloride metathesis reaction is between about 95° C. and about 100° C.

The magnesium chloride solution is pyrohydrolyzed in the alkaline-earth metal chloride pyrohydrolysis step 125 to an alkaline magnesium solid and concentrated hydrochloric acid. The hydrochloric acid concentration produced is between about 22 wt % and about 36 wt %, with a preferred range between about 26 wt % and about 28 wt %. The alkaline magnesium solid produced includes magnesium oxychloride or magnesium oxide and can be recycled to the ammonium chloride metathesis step 120 via the second recycle stream 135.

Figure 2:
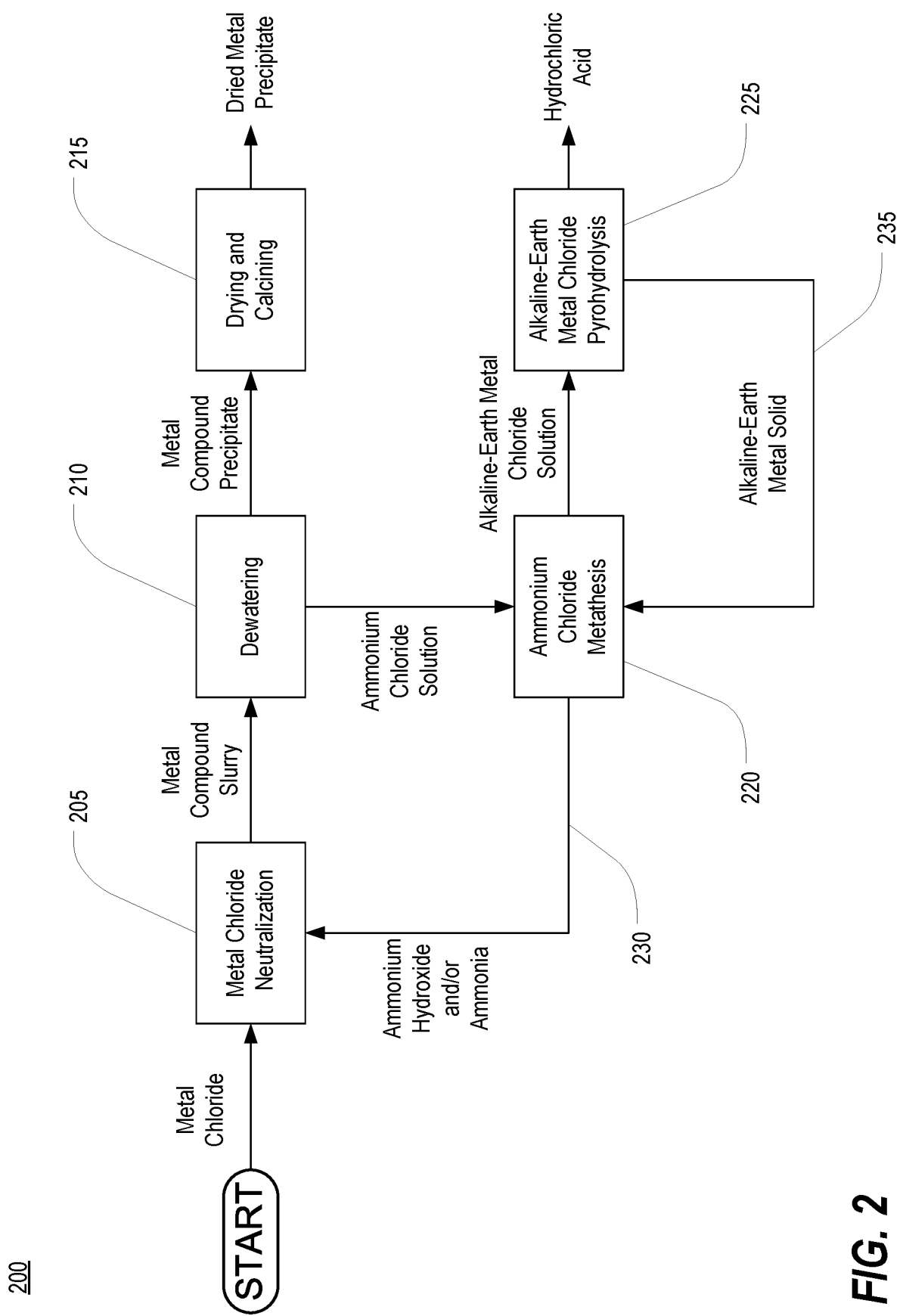
FIG. 2 is a flowchart of a method of producing hydrochloric acid and a metal precipitate, where reagents of the process are internally recycled, in accordance with one or more aspects of the invention.

FIG. 2 is a flowchart of a method 200 of producing hydrochloric acid and a metal precipitate, where reagents of the process are internally recycled, in accordance with one or more aspects of the invention. As shown in FIG. 2, a concentrated hydrochloric acid, along with a metal precipitate, is producible using a metal chloride solution. Two internal recycle streams can substantially eliminate the consumption of reagents of the process.

As shown in the flowchart of FIG. 2, the method 200 is initiated with the provision of a metal chloride solution. It is contemplated that the metal chloride solution used in connection with the process of FIG. 2 may be a waste stream byproduct of another industrial or chemical process. In various contemplated embodiments, the metal component of the metal chloride solution may include one or more lanthanoid metals, one or more actinoid metals, one or more transition metals, one or more post transition metals, or combinations of any of the foregoing.

In a neutralization step 205, the metal chloride solution is placed in a reactor with ammonia or ammonium hydroxide to produce a metal compound slurry and ammonium chloride. In various contemplated embodiments, the metal compound slurry may include a metal hydroxide, a mixture of metal hydroxides, a metal oxide, or a mixture of metal oxides.

In at least some contemplated embodiments, an ammonium hydroxide concentration can be varied from 10% to saturation, or alternatively, anhydrous ammonia can be injected in the system in connection with the neutralization step 205. It is further contemplated that the neutralization reaction is performed at an operating temperature between about 25° C. and the solution boiling point, or, more preferably, between about 85° C. and about 100° C. Many different reactor configurations could be used to achieve the neutralization reaction of step 205. It is also contemplated that the operating temperature could be increased or decreased based on the operating pressure of the system.

In a dewatering step 210 of the method 200 of FIG. 2, the metal compound slurry from the neutralization step 205 is dewatered to produce a metal compound powder and an ammonium chloride solution. In the dewatering step 210, a solid component is separated from the ammonium chloride solution. In various contemplated embodiments, separation of the solid and aqueous components can be accomplished by one or more of pumping, filtration, or centrifugation. In contemplated embodiments, the metal compound slurry is dewatered to produce a metal compound powder having a solids content between about 40 wt % and about 85 wt % solids, or, more preferably, between about 70 wt % and 80 wt % solids. It is further contemplated that different metal hydroxides and metal oxides can be dewatered and precipitated in a sequential manner in order to facilitate separation of different precipitates from one another.

The metal compound powder produced from the dewatering step 210 can be passed to a drying and/or calcining step 215 or treated further for use in connection with other industrial or chemical processes. Drying and/or calcining can be accomplished in a manner as detailed above in connection with the method of FIG. 1. The ammonium chloride solution from the dewatering step 210 is passed to a reactor for metathesis.

In an ammonium chloride metathesis step 220, the ammonium chloride solution from the dewatering step 210 is placed in a reactor with an alkaline-earth metal solid to produce ammonia or ammonium hydroxide and an alkaline-earth metal chloride solution. It is contemplated that the reaction of the ammonium chloride metathesis step 220 is performed near or at its boiling point. In accordance with a preferred embodiment, the operating temperature of the ammonium chloride metathesis reaction is between about 95° C. and about 100° C. It is further contemplated that the operating temperature may be less than 95° C. in an environment where a vacuum is applied. Many different reactor configurations could be used to achieve the ammonium chloride metathesis reaction of step 220. It is also contemplated that the operating temperature could be increased or decreased based on the operating pressure of the system.

In various contemplated embodiments the alkaline-earth metal solid used in the ammonium chloride metathesis step 220 includes one or more of magnesium oxide, magnesium hydroxide, or magnesium oxychloride, with the foregoing existing as compounds, as part of a mixture, or in solution. In other contemplated embodiments, the alkaline-earth metal solid is a calcium solid, such as calcium oxide or calcium hydroxide, with the calcium solid existing as a compound, as part of a mixture, or in solution.

In at least some contemplated embodiments of the ammonium chloride metathesis step 220, ammonium chloride reacts with solid magnesium oxide to produce magnesium chloride, ammonia gas, and water vapor, in accordance with the following reaction:

$$2NH_4Cl + MgO \rightarrow MgCl_2 + 2NH_3 + H_2O$$

Ammonia gas and water vapor can be condensed to produce ammonium hydroxide in accordance with the following reaction:

$$NH_3 + H_2O \rightarrow NH_4OH$$

The alkaline-earth metal chloride solution produced from the metathesis step 220 is passed along to an alkaline-earth metal chloride pyrohydrolysis step 225. Ammonia and/or ammonium hydroxide produced from the metathesis step 220 is returned, via a first recycle stream 230, to the neutralization step 205 for further reaction with metal chlorides introduced to the reactor.

In the alkaline-earth metal chloride pyrohydrolysis step 225, the alkaline-earth metal chloride solution is pyrohydrolyzed to produce an alkaline-earth metal solid and concentrated hydrochloric acid. As a separation technique, pyrohydrolysis occurs under high temperature conditions and in the presence of water to hydrolyze chlorides and other compounds. Advantageously, pyrohydrolysis facilitates a clean separation whereby resulting compounds are substantially free from contaminants. In this regard, use of pyrohydrolysis in accordance with the present invention enables production of an alkaline-earth metal solid and hydrochloric acid that are substantially free from contaminants in accordance with the alkaline-earth metal chloride pyrohydrolysis step 225.

In at least some contemplated embodiments, the hydrochloric acid concentration produced is between about 22 wt % and about 36 wt %, or, more preferably, between about 26 wt % and about 28 wt %. It is contemplated that a variety of different alkaline solids are producible in connection with the alkaline-earth metal chloride pyrohydrolysis step 225. In various contemplated embodiments, the alkaline-earth metal solid produced from the pyrohydrolysis step 225 includes one or more of magnesium oxide, magnesium hydroxide, or magnesium oxychloride. In other contemplated embodiments, the alkaline-earth metal solid produced from the pyrohydrolysis step 225 is a calcium solid, such as calcium oxide or calcium hydroxide.

In at least some contemplated embodiments of the alkaline-earth metal chloride pyrohydrolysis step 225, magnesium chloride reacts with water under high temperature conditions to produce magnesium oxide and hydrochloric acid, in accordance with the following reaction:

$$MgCl_2 + H_2O \rightarrow MgO + 2HCl$$

Hydrochloric acid produced from the alkaline-earth metal chloride pyrohydrolysis step 225 is usable as a reagent for further industrial or chemical processes. The alkaline-earth metal solid produced from the alkaline-earth metal chloride pyrohydrolysis step 225 is returned, via a second recycle stream 235, to the ammonium chloride metathesis step 220 for further reaction with the ammonium chloride solution introduced to the reactor following the dewatering step 210.

In accordance with the method 200 of FIG. 2, a concentrated hydrochloric acid along with a metal precipitate are produced, each of which may be used in connection with further industrial or chemical processes. Advantageously, the method of FIG. 2 utilizes two recycle streams 230, 235, whereby waste materials from one step of the process are recyclable for use as a reagent in another step of the process. In particular, in the first recycle stream 230, ammonium hydroxide or ammonia produced during the ammonium chloride metathesis step 220 is recyclable for use as a reagent in the metal chloride neutralization step 205. Additionally, in the second recycle stream 235, an alkaline-earth metal solid produced during the alkaline-earth metal chloride pyrohydrolysis step 225 is recyclable for use as a reagent in the ammonium chloride metathesis step 220. In this regard, the method 200 can be used to produce hydrochloric acid and a metal precipitate, without generating waste streams.

Based on the foregoing description, it will be readily understood by those persons skilled in the art that the invention has broad utility and application. Many embodiments and adaptations of the invention other than those specifically described herein, as well as many variations, modifications, and equivalent arrangements, will be apparent from or reasonably suggested by the invention and the foregoing descriptions thereof, without departing from the substance or scope of the invention. Accordingly, while the invention has been described herein in detail in relation to one or more preferred embodiments, it is to be understood that this disclosure is only illustrative and exemplary of the invention and is made merely for the purpose of providing a full and enabling disclosure of the invention. The foregoing disclosure is not intended to be construed to limit the invention or otherwise exclude any such other embodiments, adaptations, variations, modifications or equivalent arrangements, the invention being limited only by the claims appended hereto and the equivalents thereof.

What is claimed is:

1. A method for producing an iron pigment and hydrochloric acid with reduced or substantially eliminated waste streams, the method comprising:
providing an iron chloride solution, wherein the iron chloride solution includes one or both of iron (II) chloride and iron (III) chloride;
neutralizing the iron chloride solution with one or both of ammonia and ammonium hydroxide to form a slurry of an iron oxide solid component and an ammonium chloride solution;

separating the iron oxide solid component from the ammonium chloride solution;

drying and calcining the iron oxide solid component to form an iron pigment or pigment intermediate;

reacting the ammonium chloride solution with an alkaline-earth metal solid to form an alkaline-earth metal chloride solution and to evolve ammonia as a vapor, wherein at least a portion of the evolved ammonia reacts with water to form ammonium hydroxide;

recycling one or both of the evolved ammonia and the formed ammonium hydroxide for use in connection with the neutralization step; and pyrohydrolyzing the alkaline-earth metal chloride solution to form hydrochloric acid and to regenerate the alkaline-earth metal solid.

2. The method of claim 1, wherein the iron pigment or pigment intermediate is a yellow color.

3. The method of claim 1, wherein the iron pigment or pigment intermediate is a red color.

4. The method of claim 1, wherein the iron pigment or pigment intermediate is a black color.

5. The method of claim 1, wherein the iron pigment or pigment intermediate includes an iron oxide pigment.

6. The method of claim 1, wherein the iron pigment or pigment intermediate includes an iron hydroxide pigment.

7. The method of claim 1, wherein the iron pigment or pigment intermediate includes an iron oxide-hydroxide pigment.

8. The method of claim 1, wherein the iron oxide solid component formed in the neutralization step includes an iron oxide-hydroxide in the form of α-goethite or β-goethite.

9. The method of claim 1, wherein the alkaline-earth metal solid includes one or more of magnesium oxide, magnesium hydroxide, magnesium oxychloride, calcium oxide, or calcium hydroxide.

10. The method of claim 1, further comprising recycling at least a portion of the regenerated alkaline-earth metal solid for use in the reaction with the ammonium chloride solution.

11. The method of claim 1, wherein a concentration of the formed hydrochloric acid is between about 22 wt % and about 36 wt %.

12. The method of claim 1, wherein a concentration of the formed hydrochloric acid is between about 26 wt % and about 28 wt %.

13. A method for producing hydrochloric acid and a metal precipitate with reduced or substantially eliminated waste streams, the method comprising:

providing a metal chloride solution;

neutralizing the metal chloride solution with one or both of ammonia and ammonium hydroxide to form a slurry of a metal compound solid component and an ammonium chloride solution;

separating the metal compound solid component from the ammonium chloride solution, wherein the metal compound solid component is a metal precipitate;

reacting the ammonium chloride solution with an alkaline-earth metal solid to form an alkaline-earth metal chloride solution and to evolve ammonia as a vapor, wherein at least a portion of the evolved ammonia reacts with water to form ammonium hydroxide;

recycling one or both of the evolved ammonia and the formed ammonium hydroxide for use in connection with the neutralization step; and pyrohydrolyzing the alkaline-earth metal chloride solution to form hydrochloric acid and to regenerate the alkaline-earth metal solid.

14. The method of claim 13, wherein the alkaline-earth metal solid includes one or more of magnesium oxide, magnesium hydroxide, magnesium oxychloride, calcium oxide, or calcium hydroxide.

15. The method of claim 13, further comprising recycling at least a portion of the regenerated alkaline-earth metal solid for use in the reaction with the ammonium chloride solution.

16. The method of claim 13, wherein a concentration of the formed hydrochloric acid is between about 22 wt % and about 36 wt %.

17. The method of claim 13, wherein the metal compound solid component formed in the neutralization step includes a metal hydroxide, a mixture of metal hydroxides, a metal oxide, or a mixture of metal oxides.

18. The method of claim 13, wherein the metal compound solid component formed in the neutralization step includes one or more lanthanoid metals, actinoid metals, transition metals, post transition metals, or combinations of any of the foregoing.

19. The method of claim 13, wherein the neutralization step forms multiple different metal compound solid components, and wherein the method further comprises precipitating the different metal compound solid components sequentially to facilitate separation of different metal precipitates from one another.

20. A method for producing an iron pigment and hydrochloric acid with reduced or substantially eliminated waste streams, the method comprising:

providing an iron chloride solution, wherein the iron chloride solution includes one or both of iron (II) chloride and iron (III) chloride;

neutralizing the iron chloride solution with one or both of ammonia and ammonium hydroxide to form a slurry of an iron oxide solid component and an ammonium chloride solution;

separating the iron oxide solid component from the ammonium chloride solution;

drying and calcining the iron oxide solid component to form an iron pigment or pigment intermediate;

reacting the ammonium chloride solution with an alkaline-earth metal solid to form an alkaline-earth metal chloride solution and to evolve ammonia as a vapor, wherein at least a portion of the evolved ammonia reacts with water to form ammonium hydroxide, and wherein the alkaline-earth metal solid includes one or more of magnesium oxide, magnesium hydroxide, magnesium oxychloride, calcium oxide, or calcium hydroxide;

recycling one or both of the evolved ammonia and the formed ammonium hydroxide for use in connection with the neutralization step;

pyrohydrolyzing the alkaline-earth metal chloride solution to form hydrochloric acid and to regenerate the alkaline-earth metal solid, wherein a concentration of the formed hydrochloric acid is between about 22 wt % and about 36 wt %; and recycling at least a portion of the regenerated alkaline-earth metal solid for use in the reaction with the ammonium chloride solution.

* * * * *